United States Patent [19]

Moser et al.

[11] Patent Number: 5,998,199

[45] Date of Patent: *Dec. 7, 1999

[54] COMPOST DECONTAMINATION OF SOIL CONTAMINATED WITH TNT, HMX AND RDX WITH AEROBIC AND ANAEROBIC MICROORGANISMS

[75] Inventors: Guy P. Moser, Guelph; Neil C. C. Gray, Oakville, both of Canada

[73] Assignee: Zeneca Inc, Wilmington, Del.

[ * ] Notice: This patent is subject to a terminal disclaimer.

[21] Appl. No.: 09/080,661

[22] Filed: May 18, 1998

Related U.S. Application Data

[63] Continuation-in-part of application No. 08/742,508, Nov. 1, 1996, Pat. No. 5,902,744.

[51] Int. Cl.$^6$ ............... B09B 3/00; C07G 17/00; D06M 16/00; C12N 1/00
[52] U.S. Cl. ............... 435/262.5; 71/15; 71/21; 71/25; 71/903; 435/170; 435/264; 435/267; 435/822; 588/207
[58] Field of Search ............... 71/15, 21, 25, 71/903; 435/170, 262.5, 264, 267, 822; 588/207

[56] References Cited

U.S. PATENT DOCUMENTS

| | | | |
|---|---|---|---|
| 5,593,888 | 1/1997 | Gray et al. | 435/262.5 |
| 5,660,612 | 8/1997 | Bernier et al. | 71/15 |
| 5,711,020 | 1/1998 | Wolfe et al. | 588/203 |
| 5,824,541 | 10/1998 | Horn et al. | 435/262.5 |

OTHER PUBLICATIONS

"Principles of Composting" Guele; The Biocycle to the Art in Science of Composting; Journal of Waste Recycling, the TJ Press Inc; 1991, pp. 14–271 Anaerobic DDT Biodegredation.
Environment of Application of Surfetants and the Low Oxidation Potential Applied Experimental Microboilogy, Dex. 1951, You et al p. 135;
Anaerobic DDT Degration of Contaminated Soil by Mixed Consortia and Enhancement by Surfactant in Slurry Reactors, You et al. Water Environmental Federation, Oct. 1994 pp. 635–645.

*Primary Examiner*—David M. Naff
*Assistant Examiner*—Deborah K. Ware
*Attorney, Agent, or Firm*—Robert J. Reichert

[57] ABSTRACT

The present invention provides a process of decontaminating, by composting under specific conditions, soil and/or sediments containing toxic contaminants of TNT, HMX and RDX. The process is carried out by converting the contaminants into harmless materials. The process includes the step of affecting a solid compost mixture during composting with a redox potential below negative 200 mV (millivolts). Further, the process includes several steps which are repeated until complete degradation is achieved. Other processes for degrading compounds such as chlordane, dieldrin, toxaphene, aldrin, endrin, and heptachlorepoxide as well as polychlorinated benzenes are also disclosed.

10 Claims, No Drawings

COMPOST DECONTAMINATION OF SOIL CONTAMINATED WITH TNT, HMX AND RDX WITH AEROBIC AND ANAEROBIC MICROORGANISMS

This application is a continuation-in-part of application Ser. No. 08/742,508 filed. Nov, 1, 1996, now U.S. Pat. No. 5,902,744.

BACKGROUND OF THE INVENTION

This invention relates to a controlled microorganism degradation process for decontaminating soil or sediments contaminated with TNT, HMX and/or RDX Numerous land sites exist that are contaminated, and have been contaminated for decades, with the highly explosive contaminants TNT, HMX, and RDX. Many of these sites are unusable and will remain unusable until some economical process becomes available for large scale decontamination of the soil of such sites.

Prior art papers disclose laboratory experiments in microorganism biodegradation of toxic compounds such as DDT by anaerobic treatment. Significant biodegradation of DDT occurred in these experiments, but toxic metabolites of DDT remained. Remediation, as hereinafter defined was not achieved by these prior art DDT techniques.

Recent U. S. Pat. Nos. 5,660,612 and 5,660,613 disclose the remediation of soil contaminated with DDT by a method comprising repeated cycles of anaerobic composting followed aerobic composting under specific conditions of water content, temperature, redox potential and the presence of microbes capable of transforming DDT into harmless materials.

This method has been tried in attempts to decontaminate soil containing various contaminants other than DDT. While this method has been found successful with limited number of specific contaminants, it was unsuccessful for many contaminants. There was no reliable way to predict which compounds would be effectively decomposed by this method, and particularly no reason to expect that it would be successful in decontaminating soil containing explosive nitro-substituted compounds.

As described in Crawford U.S. Pat. No. 5,455,173 experiments have been done to apply microbe degradation to soil contaminated with TNT and other explosives.

SUMMARY OF THE INVENTION

The present invention provides a process of decontaminating soil and/or sediments containing one or more of the nitro-substituted compounds TNT, HMX and RDX contaminants by converting the contaminants into harmless materials thereby decontaminating the soil to whatever extent desired, either partial decontamination or complete remediation. The process comprises treating soil and/or sediment that contains populations of viable anaerobic and aerobic microbes capable of transforming the contaminants into harmless materials and being viable under both anaerobic and aerobic conditions.

The treatment comprises admixing the nitro-compound contaminated soil with amendment material to form a solid compost mixture containing organic nutrient materials; composting the mixture while maintaining the temperature of the compost mixture in the range of about 20 to 65° C. and the water content of the compost mixture in the range of about 40% to 100 % water holding capacity (WHC); during this composting maintaining the redox potential of the compost mixture below about negative 200 mV until a significant amount of the aforementioned contaminants is degraded; and thereafter oxygenating the compose mixture to raise the redox potential level of the compost mixture above about positive 100 mV; and maintaining the redox potential level above positive 100 mV until a further significant amount of the contaminants is degraded. This sequence of stages of negative/positive redox potential levels can be repeated as often as necessary to yield soil or sediment containing little of these explosive compound contaminants, which have been converted to harmless materials.

DEFINITIONS

The term "composting" as used herein in describing the decontamination process of The present invention means transforming by degradation contaminants in the soil and/or sediment to harmless materials utilizing biological activity, the process being carried out in the solid state with the addition of organic nutrient material.

"The contaminants" and "the explosive contaminants" means one or more of TNT (trinitrotoluene), RDX (hexahydro-1,3,5itrinitro-1,3,5-triazine), and HMX (octahydro-1,3,5,7-tetranitro-1,3,5,7-tetrazocine). These compounds are highly explosive when present in sufficient concentrations, although these terms relating to contamination cover both explosive and non-explosive concentrations of these compounds.

"Harmless materials" are materials that are unobjectionable in the concentrations present in soil or sediment for its intended use.

"Decontamination" means transforming the contaminants to harmless materials, including biodegrading the contaminants and/or binding the contaminants to soil or other material.

"Remediation" means decontamination to an unobjectionable level of he contaminants in the soil/sediment for the intended use of the soil/sediment.

"Soil" means earth, i.e. humus, sand and particulate rock, and includes sediment from above and beneath the surface of water "mV" means millivolt.

DESCRIPTION OF THE INVENTION

In the process of the present invention, the soil to be decontaminated must contain throughout the process appropriate types of viable microbes capable of degrading the contaminants. These microbes must be viable under both the anaerobic and aerobic conditions to which they will be subjected during the present process. The microbes normally are bacteria, fungi, actinomycetes, and to a lesser extent protozoa. The microbes preferably are indigenous to the contaminated soil, that is, they are present in the soil to be decontaminated; or they are recycled from, or along with, soil already subjected to the present process. In some cases it may be beneficial to add an inoculent containing such viable microbes that degrade these multi- nitro substituted explosive contaminants.

In the practice of the present invention a solid compost mixture is prepared by mixing appropriate soil amendment into the soil to be decontaminated to give a total amount of such material of at least 10%, and up to about 95% by weight of the mixture, and preferably from about 30% to 70% by weight of amendment material, some of which may already be present in the soil. The soil amendment material comprises a conventional source of organic nutrients for composting. The preferred amendment nutrient materials are agricultural waste and municipal waste sludge, preferably a manure such as horse, cow, sheep, turkey, chicken or fish manure, or activated sludge. Alfalfa, hay, sawdust, peat, grass and other bulking materials may be present in the compost mixture, originate in manure or be specifically added.

In some cases it may be desirable to add into the soil amendment a surfactant to render the contaminants more available to biological degradation. Suitable surfactants include polysorbates, octoxynols, anionic alkyl sulfates, anionic alkyl aryl sulfates and ethoxylates. Examples of suitable surfactants include "Tween" nonionic surfactants commercially available from ICI Americas, Inc., "Triton" nonionic surfactants commercially available from Union Carbide and "DAWN" detergent commercially available from Procter & Gamble. A suitable mixture of surfactants is "Triton" and "DAWN". The amendment material may also contain, or be supplemented with, liquid or solid organic or inorganic nutrients. Organic materials high in nitrates and phosphates are normally used.

The compost mixture is maintained in a moist but solid state. Throughout the process the moisture level is maintained at less than 100% of the mixture water holding capacity WHC, preferably in the range of about 40 to 70% WHC.

After mixing, biological degradation of organic matter in the mixture starts, raising the temperature and depleting the oxygen to an anaerobic condition. The temperature of the mixture is thereafter maintained within the range of about 20–65° C. This is easily done by controlled air movement through the compost mixture (e.g. through pipes) and/or by the addition of nutrient material. Below about 20° C., the biodegradation proceeds uneconomically slowly, above about 65° C. excessive microbe kill may take place. The preferred temperature range is within about 35–55° C. The aerobic microbes in the compost mixture remain viable for the subsequent aerobic degradation steps and the anaerobic degradation microbes remain viable for any needed subsequent anaerobic degradation steps. Thus, it is essential that viable aerobic and anaerobic degradation microbes be maintained during the process of the present invention.

During the anaerobic step a low redox potential level is maintained in the compost mixture about negative 200 mV, and preferably in the range of negative 300 mV to 500 mV. This level has been found to be optimum for the anaerobic process. The redox potential level can be maintained within this range by moist air movement through the compost and/or by he addition of conventional reducing agents such as sulfite and acetate reducing compounds.

The first anaerobic step and subsequent anaerobic steps are continued until a significant amount of the contaminants is degraded in the step. This can be determined by analysis. Typically, in the first anaerobic step degradation of about 30% to 70% of the initial content of the contaminants is desirable.

After the contaminants content of the soil/manure mixture is decreased significantly in the first anaerobic stage, the mixture is oxygenated by any suitable means, preferably by air fed through and/or mixed with the mixture to achieve aerobic conditions. Oxygenation is sufficient for the redox potential level during the aerobic treatment to be maintained above about positive 100 mV. The aerobic conditions activate further degradation, yielding harmless materials. The aerobic degradation step is continued until a significant amount of the contaminants is degraded by the aerobic treatment.

In most cases, the desired degree of biodegradation of the contaminants for acceptable remediation will not be achieved in the first anaerobic/aerobic treatment sequence. In the highly preferred process, the sequences is repeated one or more times as needed for acceptable soil decontamination. Substantially complete remediation is achievable by this multi-sequence preferred sequence preferred process.

A desirable feature of this process is that the degrading microbes are maintained viable throughout the anaerobic/aerobic treatment cycles, so that it is not essential that microbes be supplemented before repeating the treatment cycle. However, it may be desirable to add more nutrient materials, manure, or other conventional fermentation ingredients, primarily to supplement the organic feed supply and to also introduce more bulking agent.

As aforementioned, maintaining the proper redox potential levels of the compost mixture in the anaerobic and aerobic steps is necessary for effective practice of the present process. The appropriate redox potential levels can be maintained by the addition of conventional nutrient materials and/or reducing agents such as sulfite and/or acetate compounds. Absolute anaerobic and aerobic conditions are needed (although short localized excursions can be expected). For the purpose of the present invention, a redox potential level of less than about negative 200 mV is considered anaerobic, and is required for the anaerobic steps; and a redox potential level greater than about positive 100 mV is considered aerobic and is required for the aerobic steps. During the anaerobic steps, the preferred redox potential level is in the range of about 300 to 500 mV; and during the aerobic steps it is in the range of about positive 200 to 300 mV. The redox potential level from about negative 200 mV to about positive 100 mV is considered anoxic. In the present invention, when going from anaerobic to aerobic conditions, and visa versa, anoxic conditions are present in the compost. During this period, degradation of some amounts of the contaminants appears to take place, but at low rates. Thus, speedy transition from one state to the other expedites overall degradation.

In the practice of the present invention, it may be desirable to have anaerobic conditions in some parts of these compost and at the same time aerobic conditions in other parts. This may be desirable because of different initial contaminant levels and/or degradation rates in different parts of he compost mixture. Thus, to approach uniform degradation, it may be necessary for some parts of the compost to remain longer in an anaerobic or an aerobic state.

During composting high microbe counts are present, preferably up to 10 to the eighth power aerobic culture forming units per gram, as measured by standard plate count techniques (cfu), and up to 10 to the sixth power anaerobic cfu/g. These microbe counts of course include microbes other than those that degrade the contaminants.

In practice the present process is conducted in a compost container, normally in a container cell or windrow. The soil to be treated can be analyzed and composted in the laboratory to determine optimum conditions of amendment composition, and anaerobic/aerobic treatment times and number of sequences. Typically for soil contaminated with up to 20,000 ppm. of contaminants, 90% reduction can be obtained by 2 sequences of 4 weeks anaerobic composting followed by 2 weeks or aerobic treatment are adequate.

As described above, the present process involves an anaerobic composting stage followed by an anaerobic stage. However, it may be desirable to initially treat the soil anaerobically to lower the content of pre-existing undesirable materials prior to the first anaerobic stage.

The following examples are illustrative of the preferred practice of the present invention.

EXAMPLE 1

250 ml samples of soil are spiked with TNT and prepared in the ratio 55% (v/v) spiked soil, 40% dairy cattle manure and 5% straw. The spiked, amended and mixed soil is dispensed into sample jars in duplicate to prepare for destructive sampling at 0 and 6 weeks. The treatment jars are incubated under anaerobic conditions (redox level in the range of −250 to −300 Mv) at 45 degrees for 4 weeks, followed by a 2-week aerobic incubation at 34 degrees and 80% relative humidity. The samples are at 25–35% water holding capacity. The 0 weeks samples are frozen at −70 degrees until the study is completed. After 6 weeks all samples are submitted for chemical analysis in one lot to reduce batch to batch analytical variations. All soil samples are extracted and analyzed using EPA method 8080. The 6 week soil samples, after composting, contain only 0.05 ppm TNT; 99% decontamination was achieved.

EXAMPLE 2 & 3

The procedure of Example 1 is followed except that, instead of TNT, one set of soil samples is spiked with about 5 ppm of HMX and a second set of samples is spiked with about 5 ppm of RDX. After completing the 6 weeks treatment, it is found that significant decontamination of 6 weeks soil samples has taken place.

What is claimed:

1. A process of decontaminating soil containing at least one contaminant selected from the group consisting of TNT, HMX, and RDX, which soil contains populations of viable anaerobic and aerobic microbes capable of transforming said contaminant into materials that are unobjectionable in said soil in the concentrations present and being viable under both anaerobic and aerobic conditions comprising:
   (a) admixing said soil with organic nutrient material for composting to form a solid compost mixture;
   (b) composting said soil while maintaining the temperature of the compost mixture in the range of about 20–65° C. and a water content of the compost mixture in the range of about 40–100% of water holding capacity;
   (c) during said composting maintaining a redox potential level of the compost mixture below about negative 200 mV until said contaminant is partially degraded;
   (d) thereafter oxygenating the compost mixture to raise the redox potential level of the compost mixture to above about positive 100 mV, and maintaining the redox potential level to above about positive 100 mV until said contaminant is further degraded.

2. The process of claim 1 wherein the sequence of steps (b) through (d) are repeated.
3. The process of claim 1 wherein said compost mixture contains at least about 10% by weight of organic nutrient material for composting.
4. The process of claim 1 wherein at least part of the organic nutrient material required to maintain the anaerobic and aerobic microbes populations viable is present in the contaminated soil.
5. The process of claim 1 wherein said organic nutrient material for composting comprise one or more of agricultural waste and municipal waste.
6. The process of claim 1 a surfactant is added to said compost mixture.
7. The process of claim 1 wherein said temperature is maintained in the range of about 30 –55° C.
8. The process of claim 1 wherein said compost mixture contains in the range of 30–70% by weight of said organic nutrient material.
9. The process of claim 1 wherein said redox potential level in step (e) is maintained in the range of about negative 300 to 500 mV and said redox potential level in step (d) is maintained in the range of about positive 200 to 300 mV.
10. A process of decontaminating soil containing at least one multi-nitro substituted contaminant selected from the group consisting of TNT, HMX, and RDX, which soil contains populations of viable anaerobic and aerobic microbes capable of transforming said contaminant into materials that are unobjectionable in said soil in the concentrations present and being viable under both anaerobic and aerobic conditions comprising:
   (a) admixing said soil with organic nutrient material comprising agricultural waste or municipal waste to form a solid compost mixture wherein said compost mixture contains at least about 10% by weight of said organic nutrient material;
   (b) composting said mixture while maintaining the temperature of the compost mixture in the range of about 20–65° C. and a water content of the compost mixture in the range of about 40–100% of water holding capacity;
   (c) during said composting maintaining a redox potential level of the compost mixture below about negative 200 mV until said contaminant is partially degraded;
   (d) thereafter oxygenating the compost mixture to raise the redox potential level of the compost mixture to above about positive 100 mV, and maintaining the redox potential level above about positive 100 m mV until said contaminant is further degraded; and
   (e) repeating steps (b) through (d) until the decontamination is achieved.

* * * * *